United States Patent
Graham

[11] 3,941,351
[45] Mar. 2, 1976

[54] BALL TYPE VALVE WITH HIGH PRESSURE SEALING CAPABILITY
[75] Inventor: William J. Graham, Metairie, La.
[73] Assignee: Texaco Inc., New York, N.Y.
[22] Filed: Dec. 9, 1974
[21] Appl. No.: 530,896

[52] U.S. Cl. .............................. 251/161; 251/163
[51] Int. Cl.[2] ........................................ F16K 25/00
[58] Field of Search ............ 251/160, 161, 162, 163

[56] References Cited
UNITED STATES PATENTS

| | | | |
|---|---|---|---|
| 2,076,839 | 4/1937 | Heggem | 251/163 |
| 3,033,513 | 5/1962 | Vulliez | 251/163 |
| 3,473,554 | 10/1969 | King | 251/163 X |
| 3,625,478 | 12/1971 | Killian | 251/163 |

*Primary Examiner*—Harold W. Weakley
*Attorney, Agent, or Firm*—T. H. Whaley; C. G. Ries; Henry C. Dearborn

[57] ABSTRACT

An improvement of a ball type valve which includes structure for conventional closing by quarter turn rotation of the ball, plus pressure sealing of the valve when closed by rocking about a tangential axis. It provides structure to permit both the closing and the pressure sealing, with less than a half turn of a control handle for each.

4 Claims, 8 Drawing Figures

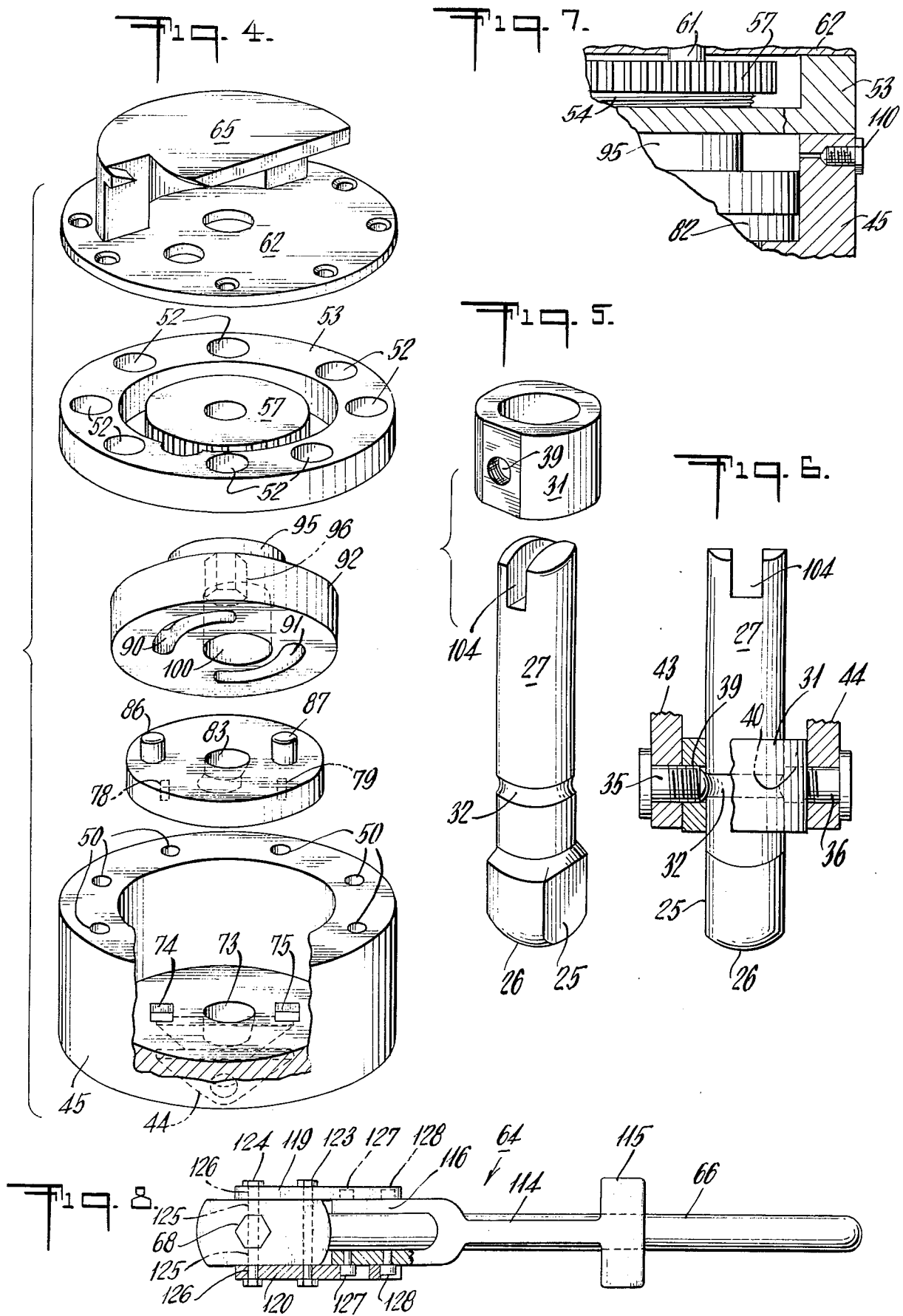

BALL TYPE VALVE WITH HIGH PRESSURE SEALING CAPABILITY

BACKGROUND OF THE INVENTION

1. Field of the Invention

This invention concerns valves, in general, and more specifically deals with a ball type valve. In particular it concerns such a valve that is for use in high pressure or other severe conditions.

2. Description of the Prior Art

Heretofore it has been preposed that a ball type valve may be constructed so that the core thereof has two separate movements. One movement is for the main opening and closing of the principal valve passageway, and the other is for applying a high pressure seal after the valve has been primarily closed. Such a known valve structure is exemplified by a U.S. Pat. No. 3,515,371 issued to one R. W. King, et al on June 2, 1970.

It is an object of this invention to improve upon the foregoing prior structure, by providing a combination that permits actuating a ball type valve in such a manner as to greatly reduce the height of the valve stem while at the same time providing for actuating both the primary closing function and the pressure sealing action. At the same time it uses less than 180° of rotation of the valve handle in accomplishing each action. Thus, a valve of the type under consideration is provided by this invention. And it is much more compact while it also avoids the necessity of multiple turning of the valve handle in manipulating the valve.

SUMMARY OF THE INVENTION

Briefly, this invention relates to an improvement that is in combination with a ball type valve for use in high pressure or severe conditions. The valve has a valve handle and a spherical core cooperating with a valve seat in a body with a fluid passage therethrough. The said core is rotatable about an axis transverse to said fluid passage and has an opening there-through for alignment with said passage when in the fully open position. The said core is also rotatable a limited amount about another axis tangential to said core for forcing the core against the said seat. The improvement comprises means for actuating said core with less than a half turn of said handle for each of said rotations.

Again briefly, the invention concerns an improvement that relates to a combination with a ball type valve for use in high pressure or severe conditions. The said valve has a spherical core cooperating with a valve seat in a body with a fluid passage there-through, the said core is rotatable about an axis transverse to said fluid passage, and it has an opening there-through for alignment with said passage when in the fully opened position. The said core is also rotatable a limited amout about another axis tangential to said core for forcing it against said seat. The invention concerns the improvement that comprises a short stem on said core coaxial with said transverse axis and having a diametrical groove across the free end thereof, and a toggle mounted in cooperative relation with said groove for rotating said core and stem when the toggle is coaxial with said stem. The said groove and toggle having matching cylindrical curvatures for permitting pivotal movement of the toggle about an axis parallel to said tangential axis. The improvement also comprises a sleeve for mounting said toggle rotatable therein. The said sleeve has pivot bearings for mounting said toggle and sleeve on said valve body, and the improvement comprises a valve shaft mounted for axial rotation and for limited longitudinal translation. The improvement also comprises a lever arm for actuating said shaft in rotation and incorporating an additional valve shaft lever for actuating said shaft in translation. The improvement also comprises cam means for actuating said toggle in said pivotal movement for rotating said core in said limited rotation about the said tangential axis, and tongue and groove means on said valve shaft and said toggle for engagement when said shaft is translated into engagement with said toggle for axial rotation thereof.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 4 is an enlarged exploded view in perspective, illustrating the various actuation elements that are mounted in the cooperative relationship when assembled as shown in FIGS. 1, 2, and 3;

FIG. 5 is more enlarged perspective, illustrating, in an exploded relationship, the toggle and sleeve elements;

FIG. 6 is a side elevation of the toggle and the sleeve partly broken away in cross section as well as a fragmentary showing of the mounting on the body of the valve;

FIG. 7 is a fragmentary cross sectional view of the upper structure for the body of the valve, illustrating a pressure relief element which may be incorporated therein; and FIG. 8 is a plan view partially broken away in cross section, illustrating the principal lever arm and the valve shaft lever which cooperates therewith.

DESCRIPTION OF THE PREFERRED EMBODIMENT

Figures 1, 2, 3:
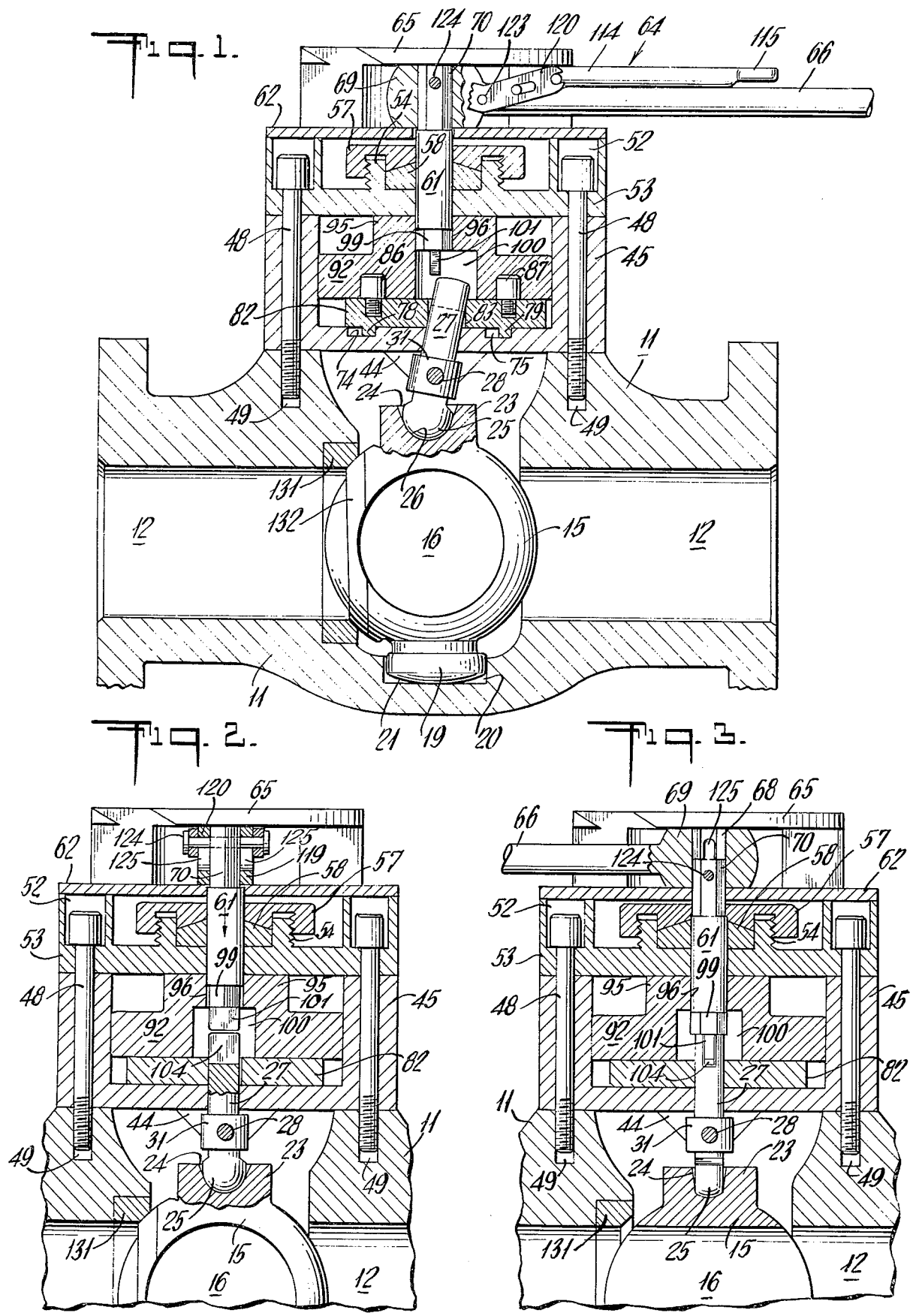
FIG. 1 is a longitudinal cross sectional view illustrating a valve according to the invention, showing the parts in the positions they take when the valve is closed and tightly sealed.
FIG. 2 is a fragmentary cross sectional view similar to that FIG. 1 but showing the parts in the positions they take when the valve is closed prior to the tight sealing action.
FIG. 3 is another fragmentary cross sectional view like FIG. 2 but illustrating the valve in its fully open position.

As indicated above, there has been proposed heretofore a ball valve structure that combines the ordinary action for full opening and closing of the rotatable ball (with a 90° turn) plus the action of tipping the ball after it is in the closed position. The latter forces a pressure seal to maintain the valve tight shut under high pressure or other severe conditions. However, such a valve involved the use of a long valve stem which included a multiple turn thread on the shaft. It required as many as 20 turns of a handle to actuate the valve. On the other hand, a valve according to this invention is able to accomplish substantially the same functions while only employing a quarter turn for each of the separate closing and wedging actions.

Referring to the drawings, it will be noted that the total valve assembly is illustrated in FIG. 1. There is a valve body 11 that has a fluid passage 12 extending there-through. A spherical valve core 15 is centrally located in the passage 12 and, it has a fluid passage 16 which passes transversely there through. Passage 16 has substantially the same diameter as the passage 12 through the body of the valve.

The core 15 is rotatable in a conventional manner for 90° about an axis that is transverse to the axis of the passage 12. This effects the principal opening and closing of the valve passage. Thus, when the valve core 15 is in the position illustrated in FIG. 2 the valve passageway 16 is closed. But, when the core 15 is rotated 90° into the position illustrated in FIG. 3 the passageway 16 is fully open.

Then, in a manner similar to the prior patent mentioned above, after the valve core 15 has been rotated to its valve closing position, it may be rotated a limited amount about an axis that is tangential to the sphere of the core 15. Such axis is parallel to the axis of the passage 16 and extends through a central portion of a hub 19 that is integral with the bottom of the core 15.

It will be appreciated that the hub 19 is coaxial with the transverse axis about which the core 15 is rotated during the principal opening and closing action, described above.

There is a circular recess 20 in the body 11 of the valve which supports the hub 19 and permits free rotation therein. Also, the hub 19 has curved surfaces 21, as illustrated in FIG. 1, in order to provide for the limited rotation about the tangential axis as described above.

The core 15 has a short stem 23 that is located opposite the hub 19, and is also coaxial with the foregoing transverse axis. The stem 23 has a groove 24 which lies diametrically across the free end of the stem 23. However, it only extends far enough to accomodate the width of an end 25 on a toggle 27. At the same time the groove 24 has a cylindrical curved surface across its other dimension, which matches a cylindrical outer surface 26 on the end 25 of the toggle 27.

It may be noted that the cylindrical curved surface 26 of the toggle 27 fits snugly into the matching groove 24 so that when the toggle 27 is in its upright, or coaxial position, as illustrated in FIGS. 2 and 3, it may be rotated on its longitudinal axis and will thus cause the core 15 to rotate therewith about the above described transverse axis. On the other hand, there is a pivotal axis 28 for the toggle. And, when the toggle is pivoted thereabout, the cylindrical surface 26 and matching cylindrical surface of the groove 24 permit a sliding action with one another while the core 15 is caused to rotate thru its limited rotation about the tangential axis.

The toggle 27 is mounted for support from the body of the valve 11 by means of a sleeve 31. This sleeve 31 supports the toggle 27 for free rotation therein, as is clearly indicated by FIGS. 5 and 6. However, the toggle 27 is restrained against longitudinal movement relative to the sleeve 31 by means of a circular groove 32 that is shown in FIGS. 5 and 6.

The sleeve 31 is firmly mounted for support from the superstructure of the body 11 of the valve while permitting pivotal movement in conjunction with the toggle 27. There is a pair of round tipped bolts 35 and 36 that are in threaded engagement with the sleeve 31 through a corresponding pair of internally threaded holes 39 and 40 respectively. The bolts 35 and 36 pass through holes in a pair of depending webs 43 and 44 that are an integral part of a sub-bonnet 45 which makes up part of the superstructure which is mounted on the body 11 of the valve.

The sub-bonnet 45 is firmly mounted in place on the body 11 of the valve by a plurality of bolts 48 that engage tapped holes 49 in the body 11 of the valve. Of course, the bolts 48 extend through a corresponding plurality of holes 50 in the sub-bonnet 45, in order that it may be bolted securely in place onto the body 11 of the valve.

There is a circular bonnet 53 that bolts onto the upper edge of the sub-bonnet 45 and is held in place by the heads of the bolts 48, in the manner indicated in FIGS. 1, 2 and 3. It will be noted that the heads of the bolts 48 are countersunk below the top surface of the bonnet 53 by having larger holes 52 bored down from that surface.

The bonnet 53 has a centrally located, threaded hub 54 which is an integral part thereof. This hub engages a pressure cap 57 which applys pressure to a sealing ring 58 that surrounds a short valve-shaft 61 the function of which will be described in greater detail hereafter.

The top of the bonnet 53 is covered by a plate 62 that has a superstructure 65. The superstructure acts as a cap to hold a wrench 64 in place as it engages the end of the shaft 61. The wrench 64 has a handle 66 which acts as a lever arm for rotating the valve shaft 61. The wrench has a head 69 which has a hexagonally shaped hole 68 there-through for matching by a sliding fit over a hexagonal upper end 70 of the valve-shaft 61.

The sub bonnet 45 has a hollow interior and there is a centrally located hole 73 through the bottom. The toggle 27 extends thru the hole 73 which is large enough to permit tipping of the toggle as it pivots about the axis 28.

In the surface of the bottom of the sub bonnet 45, there is a pair of short rectangular grooves 74 and 75. These grooves receive a pair of protuberances or ears 78 and 79 respectively, that extend down from the bottom of a cam disc 82 so as to confine the movement of this disc in a diametrical direction.

The cam disc 82 also has a centrally located hole 83 there-through which is shaped to permit the tipping or pivoting movement of the toggle 27. On the upper surface of the cam disc 82 there are pair of lugs 86 and 87. These may be attached to the cam disc 82 in any feasible manner, e.g. by having threaded extensions as illustrated. The lugs 86 and 87 fit slideably into a pair of curved cam grooves 90 and 91 respectively which are located in the lower surface of a rotatable cam drive member 92.

It may be noted that the cam drive member 92 fits in a freely rotatable manner within the hollow portion of the sub bonnet 45. Also, the cam drive member 92 has a concentric raised portion or hub 95, and this hub has a hexagonal hole 96 centrally located there-through.

Hole 96 accommodates a lower hexagonal shaped end 99 of the valve-shaft 61. The hexagonal hub 96 extends thru the hub 95 into a recess 100 that is eccentrically located relative to the cam drive member 92. The recess 100 accomodates the upper end of the toggle 27 and also the lower end of the valve-shaft 61. Valve-shaft 61 has a tongue 101 that extends diametrically across the end of the shaft 61. This tongue is designed to fit into a slot 104 across the upper end of the toggle 27, when the valve-shaft 61 has been rotated into alignment therewith. However, the dimensions of the parts are such that when the valve shaft 61 is raised into the disengaged position illustrated in FIG. 1 and FIG. 2, the lower end of the tongue 101 does not contact the upper end of the toggle 27.

FIG. 7 shows a feasible location for a pressure relief plug 110 that may be inserted in the sub bonnet 45 below the bonnet 53 in order to provide for pressure relief for safety in disassembling the valve.

FIG. 8 illustrates the wrench 64 which has the handle 66 to provide the leverage for rotational forces at the valve-shaft 61. Such rotational force or torque is, of course, applied for both of the separate stages, i.e. the principal valve opening and closing operation, as well as the pressure sealing of the valve. The handle 66 has a shift lever 114 mounted thereon that has a wide handle portion 115 at the free end. The lever 114 is formed into a yoke 116 at the other end. This yoke 116 fits over the inner end of the handle 66. Also, the yoke 116 connects with a pair of leverage links 119 and 120. These links are both pivotally supported by a through bolt 123 which extends through the wrench head 69. Another bolt 124 passes thru a pair of elongated holes 126 near the end of the links 119 and 120. These elongated holes are in alignment with a vertically elongated pair of holes 125 thru the wrench head 69 on both sides of the hexagonal hole 68 to permit freedom of relative motion between the links 119, 120 and the bolt 124 as well as the wrench head 69. This is necessary because this bolt 124 also goes through a hole in the top end of the valve-shaft 61. By means of this arrangement, the the valve-shaft 61 may be shifted from the upper or disengaged position thereof to the lower or engaged position, relative to the toggle 27.

The attachment of the shift lever 114 to the links 119 and 120 may be arranged for providing disengagement in the manner illustrated, so that the lever 114 and its handle 115 may be folded back against the main handle 66 after use. Such disengagement involves the use of stud bolts 127 and 128 that are fastened into the yoke 116. The heads of these studs are accomodated by the elongated holes and end slots, as illustrated, so that the engagement and disengagement may be carried out by longitudinal movement of the shift lever 114.

It will be appreciated that the valve includes a valve seat 131 which is mounted in the body 11 in any feasible manner. Also, if desired the core 15 may include a hard faced ring 132 for cooperating with the seat 131 as the high pressure closing action is applied.

Operation

With reference to FIGS. 1, 2 and 3 in particular, the operation of the valve may be described as follows.

Commencing with the valve in its fully open position, as is illustrated in FIG. 3, the core 15 stands rotated so that the passage 16 is in alignment with the passage 12 through the valve. Consequently the fluid flow is unrestricted. Then, in order to carry out the first principal closing action, the valve handle 66 is rotated ninety degrees and this turns the valve core 15 so as to set its passage 16 across at right angles to the passage 12, which substantially closes the valve.

The foregoing action is accomplished with the valve-shaft 61 in its lower position. That position is accomplished by raising the shift lever 114 when it is in engagement with the links 119 and 120. The links pivot about the bolt 123 and so force the bolt 124 down in the elongated holes 125 while carrying the valve-shaft 61 with it.

The shifting must, of course, be carried out when the tongue 101 is in alignment with the slot 104 in the top of the toggle 27. After the shift has been made and the tongue 101 is in engagement with the groove 104 at the top of the toggle 27, rotation of the valve handle 66 carries the core 15 with it.

Next the tight pressure seal of the valve core 15 is accomplished by carrying out limited rotation of the valve core 15 about the tangential axis which goes through the hub 19. This follows a shifting back of the valve-shaft 61 to disengage it from the toggle. Then when the valve handle 66 is turned thru another 90° rotation it will, in addition to causing the shaft 61 to rotate, also rotate the cam drive member 92 because it is now engaged with the shaft 61 by the hexagonal hole 96 and the hexagonal end surface 99 of the shaft 61.

When the cam drive member 92 is rotated, it will cause the cam 82 to be shifted diametrically as the cam grooves 90 and 91 act on the lugs 86 and 87. During this action the cam disc 82 is prevented from rotating by reason of the ears 78 and 79 which engage the short grooves 74 and 75 located in the floor of the hollow interior of the sub bonnet 45. The lateral movement of the cam disc 82 causes a pivoting action of the toggle 27. Consequently it is tipped from the position illustrated in FIG. 2 toward the position illustrated in FIG. 1. Such pivoting of the toggle 27 takes place about its pivot axis 28 which is fixed relative to the body of the valve.

It may be noted that the sleeve 31 is free to pivot with the toggle but otherwise is held securely in place by the webs 43 and 44 through which the pivot bolts 35 and 36 pass. However, the toggle may rotate on its own axis because of the circular groove 32.

When the toggle 27 and the sleeve 31 are pivoted together it forces the stem 23 of the core 15 over toward the valve seat 131 and thus applys a pressure seal to tightly close the valve under high pressure conditions.

While a particular embodiment of the invention has been described above in accordance with the applicable statutes, this is not to be taken as in any way limiting the invention but merely as being descriptive thereof.

I claim:

1. In combination with a ball type valve for use in high pressure or severe conditions, said valve having a valve handle and a spherical core cooperating with a valve seat in a body with a fluid passage there through, said core being rotatable about an axis transverse to said fluid passage and having an opening there through for alignment with said passage when in the fully open position, and said core being also rotatable a limited amount about another axis tangential to said core for forcing it against said seat, the improvement comprising means for actuating said core with less than a half turn of said handle for each of said rotations,
said core actuating means comprising,
a short stem on said core coaxial with said transverse axis and having a diametrical groove across the free end thereof,
toggle means mounted in cooperative relation with said groove,
means for mounting said toggle means for coaxial rotation with said short stem,
means for pivoting said toggle means about an axis parallel to said tangential axis in order to force said core against said seat, and means for alternatively rotating and pivoting said toggle means to close and tighten said valve.

2. The invention according to claim 1, wherein said means for alternatively rotating and pivoting, comprises, lever means for applying said less than half turns, and wherein:

said means for mounting said toggle means comprises a sleeve incorporating pivotal bearing means for said toggle to permit said pivoting, and wherein, said means for pivoting said toggle means comprises cam means actuated by said lever means.

3. The invention according to claim 2, wherein said core actuating means also comprises, a valve shaft actuated by said lever means, said valve shaft being mounted for rotation and for longitudinal translation into either of two positions, means for rotating said toggle means when said shaft is in one position, and means for actuating said cam means when said shaft is in the other position.

4. In combination with a ball type valve for use in high pressure or severe conditions, said valve having a spherical core cooperating with a valve seat in a body with a fluid passage there through, said core being rotatable about an axis transverse to said fluid passage and having an opening there through for alignment with said passage when in the fully open position, and said core being also rotatable a limited amount about another axis tangential to said core for forcing it against said seat, the improvement comprising, a short stem on said core coaxial with said transverse axis and having a diametrical groove across the free end thereof, a toggle mounted in cooperative relation with said groove for rotating said core and stem when said toggle is coaxial with said stem, said groove and toggle having matching cylindrical curvatures for permitting pivotal movement of the toggle about an axis parallel to said tangential axis, a sleeve for mounting said toggle rotatably therein, said sleeve having pivotal bearings for mounting said toggle and sleeve on said valve body, a valve shaft mounted for axial rotation and for limited longitudinal translation, a lever arm for actuating said shaft in rotation and incorporating an additional valve shaft lever for actuating said shaft in translation, cam means for actuating said toggle in said pivotal movement for rotating said core in said limited rotation about said tangential axis, and tongue and groove means on said valve shaft and said toggle for engagement when said shaft is translated into engagement with said toggle for axial rotation thereof.

* * * * *